Aug. 30, 1938.  K. DIELS  2,128,639

ELECTRONIC DEVICE

Filed Jan. 9, 1936

INVENTOR
KURT DIELS
BY
ATTORNEY

Patented Aug. 30, 1938

2,128,639

UNITED STATES PATENT OFFICE 2,128,639

ELECTRONIC DEVICE

Kurt Diels, Berlin, Germany, assignor to Telefunken Gesellschaft für Drahtlose Telegraphie m. b. H., Berlin, Germany, a corporation of Germany Application January 9, 1936, Serial No. 58,277
In Germany November 30, 1934

8 Claims. (Cl. 250—27)

In the methods known in the prior art adapted to insure intensity modulation in cathode-ray tubes, action upon the ray current or pencil current is mostly brought about by positioning in the neighborhood of the cathode an electrode whose potential is negative in reference to the cathode. If the voltage was made sufficiently negative, no electrons were able to escape from the cathode with the result that the current flowing through the pencil was zero.

Viewed from an electron-optical angle, such a control element has the same effect as a lens which in modulation experiences constant alterations of its index of refraction. Inasmuch as this lens causes a marked refraction owing to its small radius of curvature, intersection of the electron-ray pencil occurs mostly in its neighborhood. This zone or point of intersection mostly represents a diminutive virtual cathode which is suited for producing an image upon a screen by means of an electron-optical system. One disadvantage of this system and method is that the virtual cathode during modulation constantly changes its place or location at the rhythm of the modulation potentials seeing that the controlling lens is subjected to constant alterations of its refractive index. This manifests itself in a steady fluctuation of the diameter of the spot upon the fluorescent screen for which reason a tube thus modulated can never be fully utilized, inasmuch as the spot grows to such a large size whenever the pencil current is too large that the constituent picture points or areas and picture lines will intersect or overlap.

Accordingly, this invention has as its primary object that of overcoming and obviating the aforesaid shortcomings of prior art devices.

Figure 1 embodies a diagrammatic representation of the principle of my invention.

Figure 1:
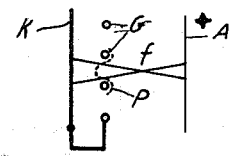

From electron-optic considerations in connection with amplifier tubes it is known that the field pattern in an amplifier tube in which cathode potential is applied to the grid remains unvaried no matter what the anode or plate potential. In Fig. 1 is schematically illustrated an amplifier tube of this kind. K denotes an equipotential cathode, G is the grid connected therewith, and A the anode or plate. As a result of the action or controllance of the plate potential between two adjacent grid wires, there are set up in the field between plate and cathode in the vicinity of the grid the curved equipotential surfaces indicated by the line P, and these, as is well known, exercise a focusing effect upon the electrons. As a result, the paths of travel of the electrons converge as far as a point or zone of intersection $f$, and thereafter they diverge again. The field pattern, and the position or locus of the focusing point in this arrangement will not be altered, even in the presence of changes of the plate potential.

This fact according to the invention is utilized for the purpose of creating a virtual controllable electron source, especially for cathode ray or so-called Braun tubes, which will not change in position during modulation or control action. If the arrangement shown in Fig. 1 is imagined to be modified in such a way (Fig. 2) that the plate is approached to a point at close proximity to the intersection and is provided with a small aperture B, then the point of intersection, in the presence of changes of positive potential at the anode, will substantially be located inside the said opening. The number of electrons emerging at B is varied in the same measure as the positive potential at the electrode A in relation to the cathode. Hence, the arrangement thus furnishes at the opening B a controllable electron source which will preserve its position in the course of modulation.

Figure 2:
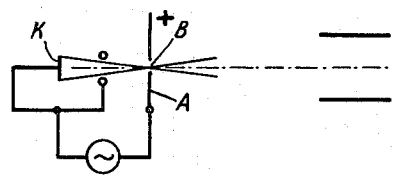
Figure 2 is an arrangement in accordance with the present invention.
Figure 3:
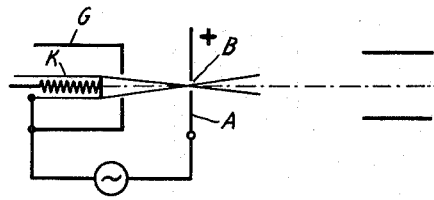
Figures 3 through 6 illustrate other modifications of the arrangement shown in Figure 2.
Figure 4:
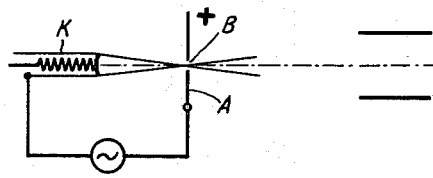
Figure 5:
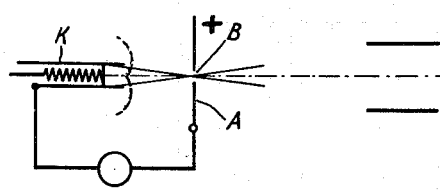
Figure 6:
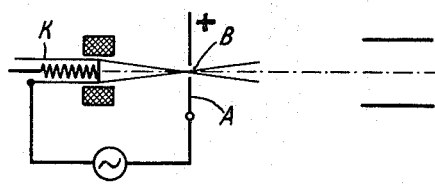

When used in connection with cathode-ray tubes the arrangement shown in principle in Fig. 2 will suitably be of a form of construction as shown by way of example in Figs. 3–6. The grid electrode G which is at cathode potential may be of any desired form at all as long as it is capable of insuring a focusing action upon the electrons in the aperture B. The electrode G could also be dispensed with entirely if by choosing a special form for the cathode surface, such as by the hollowed or concave cathode or by the flange or rim surrounding the cathode, as shown in Figs. 4 and 5 respectively, or else by the adoption of other concentrator or focusing means, say, a solenoid as shown in Fig. 6, a focusing of the electrons inside the aperture B is produced.

It will be understood that an arrangement of the kind here disclosed is useful only if the field between cathode K and the positive control electrode A is not disturbed or affected in any way by other accelerative or imaging electrodes. Hence, the controllance exercised by subsequent electrodes upon the cathode should not go beyond 0.1%. On the other hand, if as high as feasible an electron emission is to be secured, it is necessary that the value $$\frac{\Delta E_1}{\Delta E_2}$$

for constant pencil current should be over 5%. Here $\Delta E_1$ and $\Delta E_2$ stand for the changes of the voltages at the electrode G placed before the cathode and at the control electrode A, respectively.

A control electrode as here disclosed operated on positive potential may at the same time produce the effect of a space-charge grid or similar means or elements designed to enhance and raise the cathode emission.

What I claim is:

1. The method of controlling electron pencil in a cathode ray device wherein a cathode, an apertured electrode and an anode electrode are positioned, which comprises the steps of developing an electron accelerating field between the anode and cathode to cause electrons emitted from the cathode to move in the direction of the anode, focussing the emitted electrons upon the aperture in the apertured electrode to produce in the plane of the aperture a virtual cathode maintaining the plane of development of the virtual cathode fixed and applying modulating potentials to the apertured electrode.

2. The method of controlling electron pencil in a cathode ray device wherein a cathode, an apertured electrode and an anode electrode are positioned, which comprises the steps of developing an electron accelerating field between the anode and cathode to cause electrons emitted from the cathode to move in the direction of the anode, focussing the emitted electrons upon the aperture in the apertured electrode to produce in the plane of the aperture and intermediate the cathode and anode a virtual cathode and maintaining the plane of development of the virtual cathode fixed.

3. The method of controlling electron pencil in a cathode ray device wherein a cathode, an apertured electrode and an anode electrode are positioned, which comprises the steps of developing an electric field between the anode and cathode to cause electrons emitted from the cathode to move in the direction of the anode, normally focussing the emitted electrons upon the aperture in the apertured electrode to produce a virtual cathode at the focal point applying to the apertured electrode a voltage positive relative to the cathode for simultaneously controlling the electron stream passing through the aperture and maintaining the virtual cathode fixed in position irrespective of anode potential fluctuations and applying modulating potentials to the apertured electrode.

4. The method of controlling electron pencil in a cathode ray device wherein a cathode, an apertured electrode and an anode electrode are positioned, which comprises the steps of developing an electric field between the anode and cathode to cause electrons emitted from the cathode to move in the direction of the anode, normally focussing the emitted electrons upon the aperture in the apertured electrode to produce a virtual cathode at the focal point and intermediate the cathode and anode, and applying to the apertured electrode a voltage positive relative to the cathode for simultaneously controlling the electron stream passing through the aperture and maintaining the virtual cathode fixed in position irrespective of anode potential fluctuations.

5. The method of operating a cathode ray tube which comprises releasing electrons from a source, accelerating the released electrons and forming the electrons into a beam to impinge upon a viewing plane, focussing the developed electron beam at a plane intermediate the electron source and the viewing plane and within the accelerating field to produce a virtual cathode, and applying at the focal plane positive biasing potentials to maintain the location of the virtual cathode produced permanently fixed.

6. In a cathode ray tube an electron source, an anode adapted to have potentials applied thereto, means to produce a virtual cathode intermediate the electron source and the anode, and means to maintain the position of the virtual cathode unaltered for any changes in anode potential.

7. In a cathode ray tube, an electron source, an apertured control electrode, an anode adapted to have potentials applied thereto, means to produce a virtual cathode in the plane of the aperture in the control electrode, and means to maintain the position of the virtual cathode unaltered for any changes in anode potential.

8. In a cathode ray tube, an accelerating electrode, an apertured control electrode, and an electron source each positioned in alignment and longitudinally spaced one from the other, means for focussing the electrons emitted from the source upon the plane of the aperture in the control electrode for producing at the aperture a virtual cathode, and means for maintaining the position of the virtual cathode unaltered for changes in anode potential.

KURT DIELS.